Patented July 11, 1933

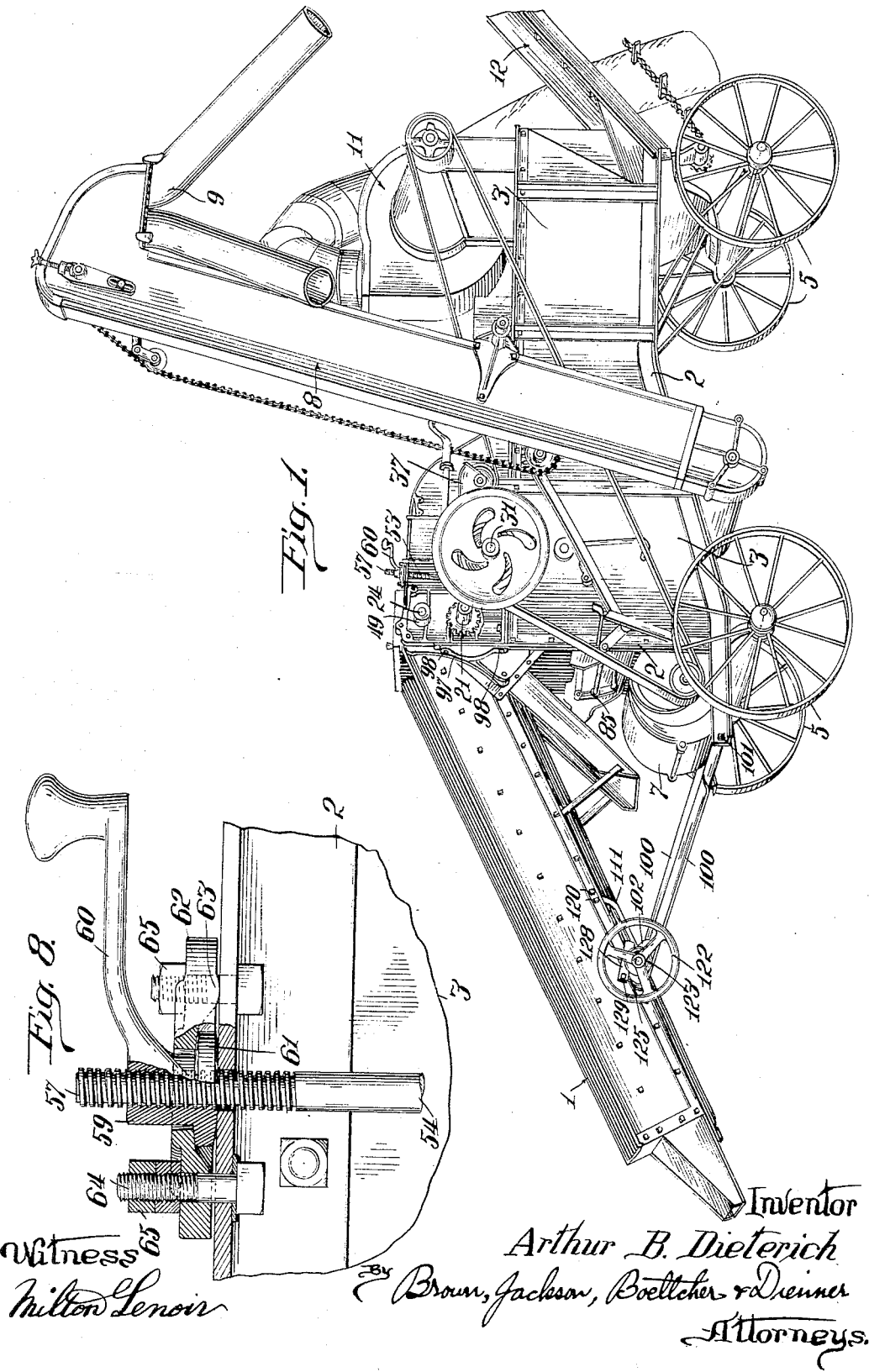

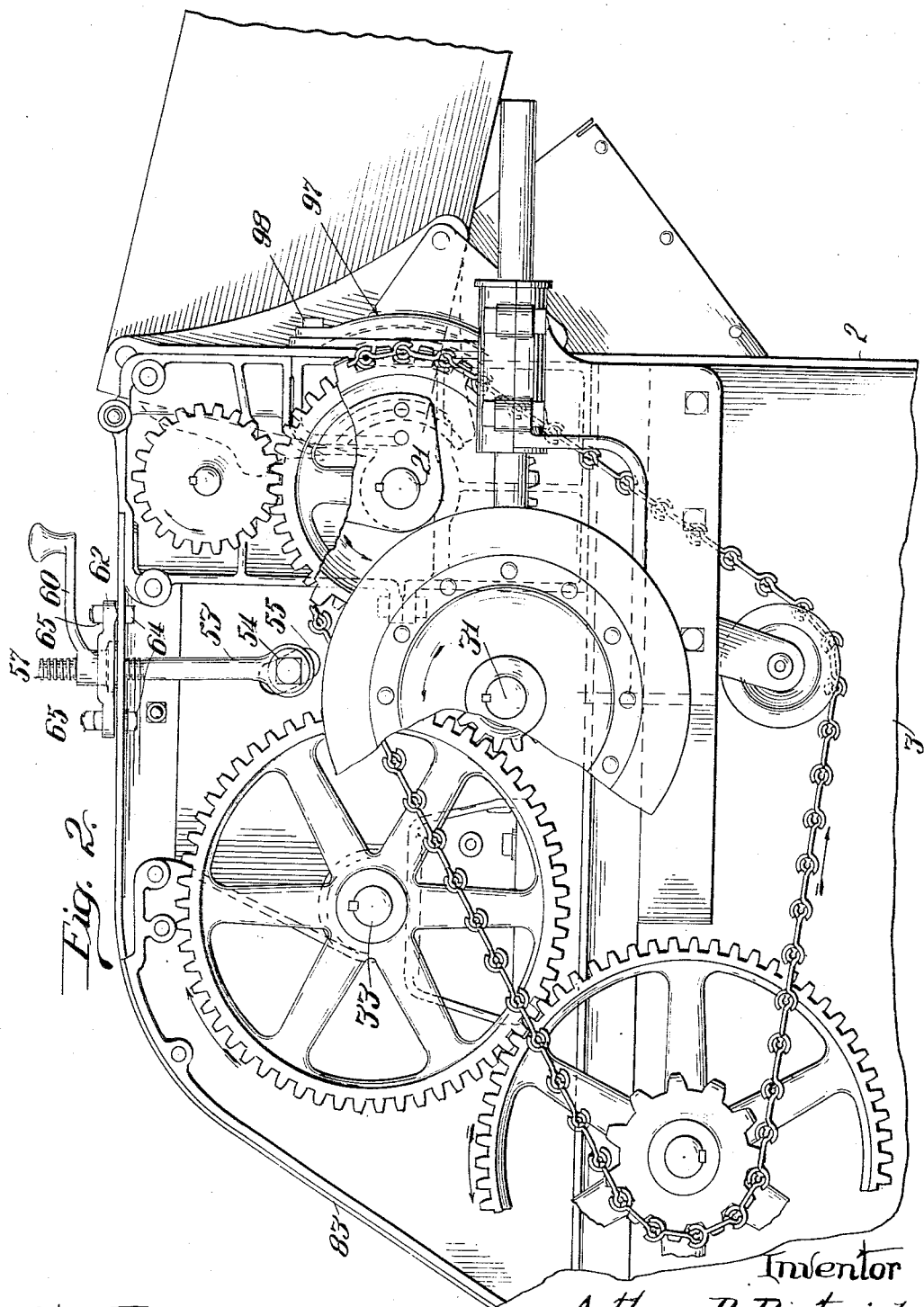

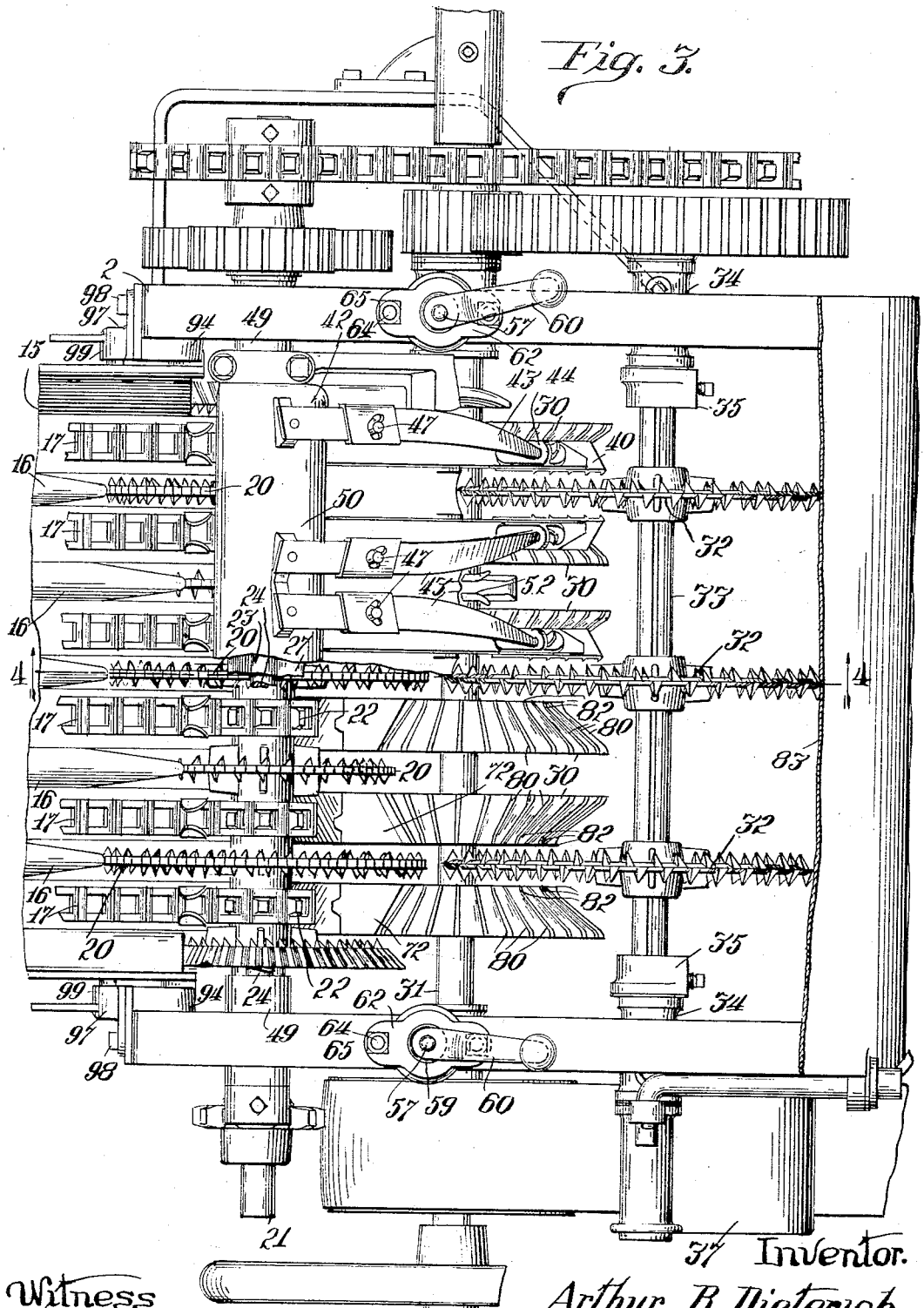

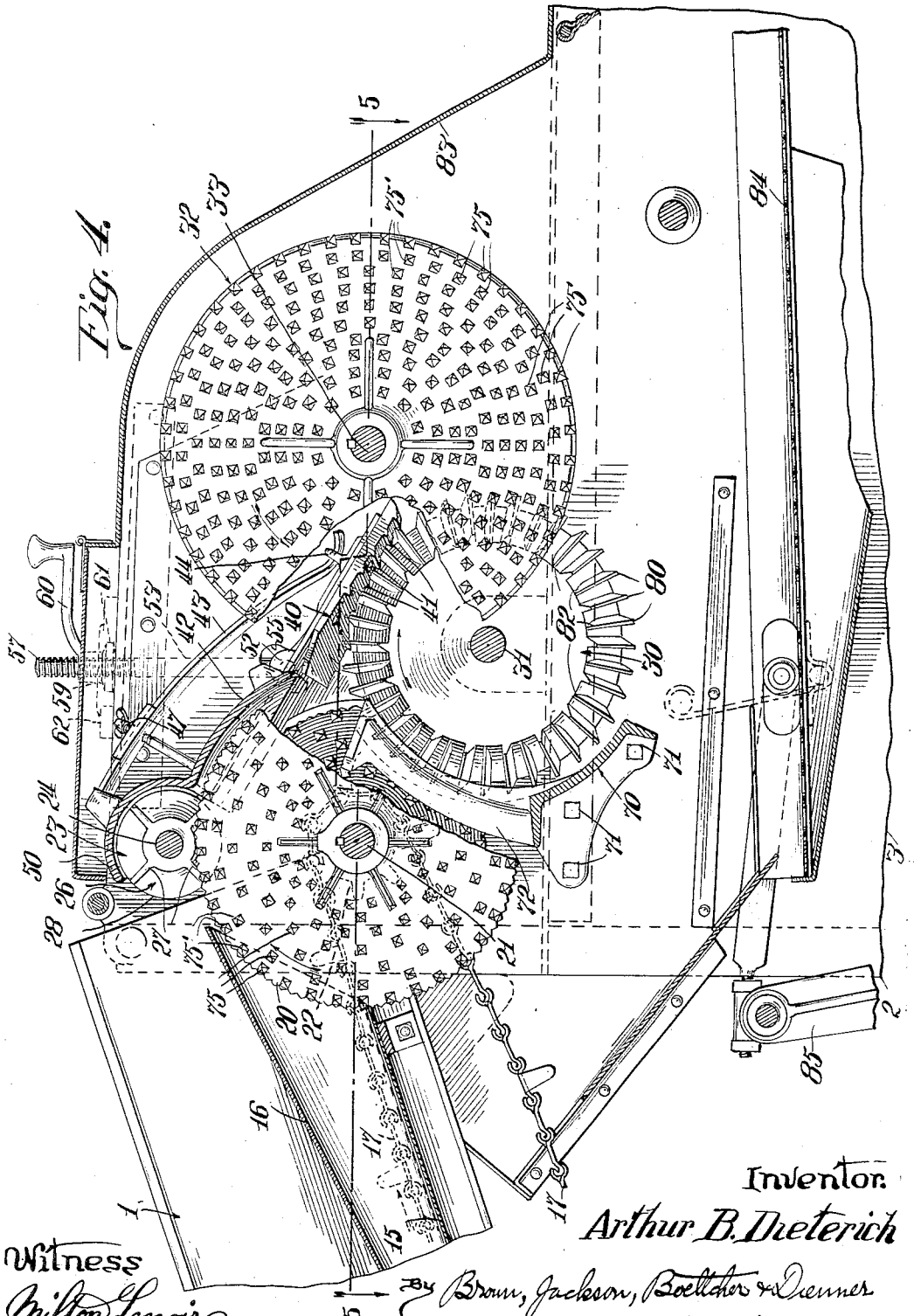

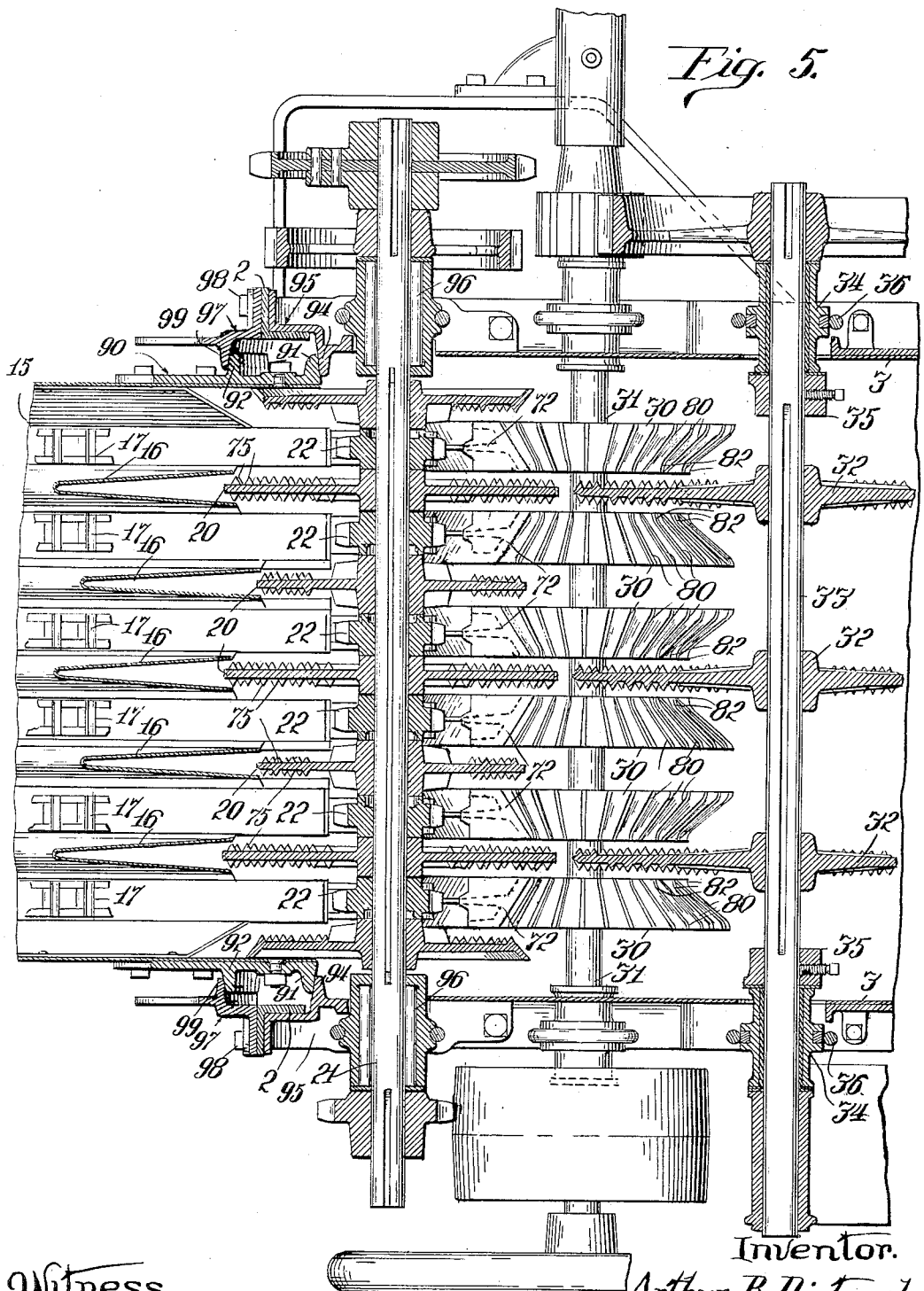

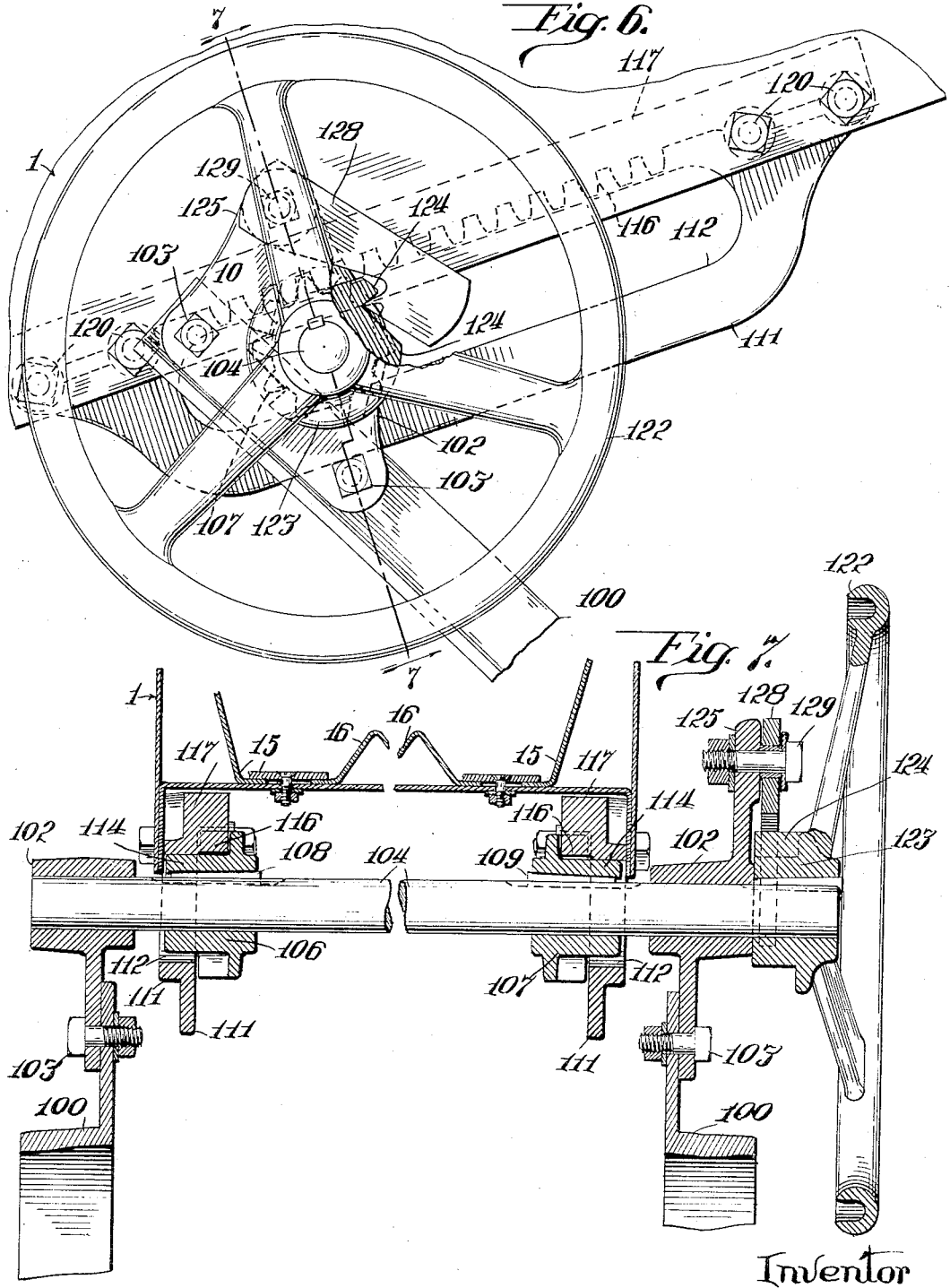

1,917,636

UNITED STATES PATENT OFFICE

ARTHUR B. DIETERICH, OF EAST MOLINE, ILLINOIS, ASSIGNOR TO DEERE & COMPANY, OF MOLINE, ILLINOIS, A CORPORATION OF ILLINOIS

CORN SHELLER

Application filed July 7, 1930. Serial No. 465,942.

The present invention relates to corn shellers and has particular reference to a power driven sheller of the type commonly known as spring shellers, although, as will hereinafter appear, the invention embodies numerous features having application to other types of corn shelling machines from the one specifically shown herein.

Briefly, shellers of this type usually comprise some form of conveyor provided with drag chains or the like for feeding corn to the shelling mechanism proper, which comprises rotatable feed wheels, beveled runners, rag irons, and straight runners in conjunction with cleaning mechanism including fans, blowers, or the like, and screens. The sheller may also include some form of grain elevator by means of which the shelled corn may be conveniently bagged or otherwise directed to a point of delivery.

One of the principal objects of the present invention is the provision of an improved rag invention is the provision of an improved rag iron and rag iron assembly by virtue of which there is little likelihood of any ear of corn being caught in any of the revolving parts associated with the rag iron and assembly thereby jamming the machine, as well as providing parts which have a longer life. Another object of the present invention is the provision of improved guard means associated with the beveled runners operating to prevent unshelled ears of corn from becoming lodged between the feed wheel and the beveled runner; still further another object of my invention is the provision of an improved form of shelling wheels or runners wherein the teeth are formed so as to provide a longer effective life; another object of the present invention is the provision of improved supporting means for pivotally connecting the upper end of the conveyor to the sheller frame proper; and, lastly, a further object of the present invention is to provide an improved means for adjusting the outer or receiving end of the conveyor.

Other objects and advantages of the present invention will be apparent to those skilled in the art after a consideration of the following detailed description of the preferred embodiment of the same, taken in conjunction with the accompanying drawings, in which:

Figure 1 is a vertical elevation showing the complete corn sheller with the present improvements embodied therein;

Figure 2 is an enlarged fragmentary elevation showing some of the driving means and adjusting mechanism on the opposite side of the machine from that illustrated in Figure 1;

Figure 3 is a top view drawn to the same scale as Figure 2, some of the parts being broken away to more clearly show some of the mechanism, and illustrating particularly the pivotal support for the rag irons;

Figure 4 is a cross-sectional view corresponding to the line 4—4 of Figure 3;

Figure 5 is a cross-sectional view taken substantially along the line 5—5 of Figure 4;

Figure 6 is an enlarged fragmentary detailed view showing the manual adjusting means for raising and lowering the outer or receiving end of the conveyor;

Figure 7 is a cross-section of the conveyor raising and lowering means and corresponding to a view taken substantially along the line 7—7 of Figure 6; and Figure 8 is a detail, partly in section, showing the improved adjusting means for adjusting the position of the rag irons.

Referring now to the drawings, particularly Figure 1, the reference numeral 1 indicates the conveyor in its entirety and which is pivotally supported upon the frame 2 of the sheller. The frame 2 carries the usual casing or panels 3 which serve to protect the mechanism of the sheller. The sheller may be mounted upon the usual wheels 5 by which the machine is transported from place to place, and the sheller includes the usual fan or blower 7, the grain elevator 8, the bagging apparatus 9, the blower 11 for blowing out the silks, husks, dust and the like, and the cob stacker 12 for conveying the cobs to one side, as is well understood in the art.

The conveyor 1 is provided with a ridged bottom 15 having ridges 16 with a plurality of drag chains 17 running upwardly between the ridges 16, as best shown in Figures 3 and 4. The purpose of the ridges 16 and the drag chains 17 is to deliver the ears of corn in longitudinal alignment to the shelling mechanism proper.

The shelling mechanism preferably includes the feed wheels 20 secured to a feed shaft 21 extending transversely of the sheller frame 2. The feed wheel shaft 21 is also provided with sprockets 22 secured thereto between adjacent feed wheels and over which the rear bights of the drag chains 17 are trained. Preferably, these sprockets are keyed to the feed wheel shaft 21 in the usual manner.

Directly above the feed wheel shaft 21 is a beater 23 comprising a beater shaft 24 having secured thereto a number of beater elements, each comprising a head element 26 having radiating flanges 27 extending longitudinally of the beater shaft 24 and transverse flanges 28. The head element 26 is keyed or otherwise fixed to rotate with the beater shaft 24, the beater cooperating with the feed wheels 20 in directing the ears of corn into the shelling mechanism proper.

As best shown in Figure 4, the shelling mechanism proper comprises a plurality of beveled runners 30 keyed to a transverse runner shaft 31 and a series of straight runners 32 keyed to a second runner shaft 33 extending transversely of the frame 2. Preferably, the runner shaft 33 is journaled in journal castings 34 at each side of the sheller frame 2, and collars 35 may be employed, if desired, to retain the runner shaft 33 in proper transverse position. The journal castings 34 are secured to the frame 2 by means of U-bolts 36. See Figure 5. Two beveled runners 30 are provided for each straight runner 32, as best shown in Figures 3 and 5, one beveled runner 30 being positioned on each side of each of the straight runners 32. The runner shaft 33 may be extended at one side so as to pivotally support the belt tightener 37, see Figures 1 and 3.

Above each beveled runner 32 a rag iron 40 is provided, each rag iron having a series of teeth 41 on its under surface, and is loosely supported on a rag iron support 42 one portion of which closely encircles the beater 23 and another portion of which encircles or is curved concentrically about the feed wheels 20, as best shown in Figure 4. The rag irons 40 are yieldingly held in close proximity to the beveled runners 30 by means of springs 43, one end of which is received within a loop or eye 44 on the rag irons 40 while the other end of the spring is adjustably mounted on the upper part of the rag iron supports 42. Thumb screw means 47 may be employed to adjust the position of the rag irons 40 relative to the support 42.

As best shown in Figure 3, the beater shaft 24 is journaled in bearing sleeves 49 which extend inwardly from each side of the frame 2. Upon these bearing extensions the rag support 42 is pivotally journaled, and from Figure 4 it will be seen that the rag iron support 42 includes portions 50 which partially embrace the beater 23 and is preferably curved about an axis which coincides with the axis of the beater shaft 24.

The means for adjusting the rag iron support 42 to bodily move all of the rag irons 40 to and from proximity to the beveled runners 30 will now be described. The rag iron support 42 is provided with a pair of lugs 52, one near each side of the machine, and a threaded shaft 53 is connected at its lower end, as by a bolt 54, to each of the lugs 52. To accommodate this construction the side panels 3 of the sheller frame may be provided with slots 55. The upper end 57 of each of the threaded shafts 53 is passed through the horizontal leg of the upper frame member 2, see Figure 8, and has threaded thereon an adjusting nut 59 provided with an operating crank 60 and a lower flange 61. The lower surface of the flange 61 bears against the upper surface of the horizontal leg of the upper frame member 2 while a clamping plate 62 frictionally engages the upper surface of the flange 61, as best shown in Figure 8. The clamping plate 62 is provided with a rocker bearing 63 adapted to rest upon the frame 2. Bolts 64 pass through suitable openings in the frame member 2 and the plate 62, and one of these bolts is provided with a pair of nuts 65. The adjustment of the nuts 65 determines the tightness with which the nut member 59 is held in adjusted position.

In order to prevent an occasional ear of unshelled corn which may have failed to have been properly directed into the shelling mechanism from finding its way to the opening between one of the feed wheels 20 and the associated beveled runners I preferably provide a special guard 70 which extends transversely across the machine underneath the beveled runner and bolted to each side by means of bolts 71. A series of upwardly extending fingers or guard members 72 is provided, projecting between the feed wheels 20 and partially embracing the periphery of the beveled runs 30, thereby substantially closing the opening above referred to. These fingers 72 may be formed integral with the guard 70 or may be formed separately and secured to the guard 70 in any manner found desirable or feasible. The upper ends of the guard members 72 may be enlarged to aid in directing the ear of corn properly to the shelling mechanism if desired.

The guard members 72 also serve another function, namely, that of preventing the conveyor or drag chains 17 from coming in contact with the beveled runners in the event that one or more of the chains 17 may break. In this way all danger of breakage of the beveled runners 30 from this cause is practically eliminated.

From Figure 4 it will be noted that the nubs or teeth 75 formed on the feed wheels 20 and the straight runners 32 are not of regular pyramid shape, that is, they do not have the same angle of inclination on all four sides, so that in the present machine the shape of the nubs or teeth 75 is such that the working face 75' on the feed wheels and the straight runners is substantially perpendicular to the face of the wheel or runner. By reason of this construction the effective life of the feed wheels and straight runners is materially increased, and the nubs or teeth retain their gripping power longer and do not wear round prematurely.

From Figure 4 it will also be noted that the teeth 80 on the beveled runner have also been formed so that the leading or working face of each tooth lies substantially in a radial plane or approximately perpendicular to the direction of travel. In this way the effective life of the teeth of the beveled runner has been materially increased, for the same reasons as noted above. In addition, and as best shown in Figures 3 and 5, every other tooth on each of the beveled runners has a portion 82 curved outwardly so as to present a greater contacting surface around the circumference of the ear of corn being shelled, thereby increasing its grip on the corn and correspondingly increasing the shelling power of each beveled runner. The teeth on the rag iron 40 may also be curved if desired.

Another principal feature of the present invention relates to the positioning of the rag irons 40. From Figure 4 it will be noted that the rag irons are only slightly inclined to the horizontal. By virtue of this construction the grains of corn are directed substantially laterally or horizontally as they are being shelled from the cob by the rapidly rotating beveled runners 30. The shelled corn is directed with considerable velocity against an inclined baffle wall 83 from which the grains can fall with reduced velocity upon the screen 84, which is oscillated in the usual manner by mechanism indicated in its entirety by the reference numeral 85. Heretofore the rag irons 40 have been so positioned with respect to the straight runner and beveled runner that the grains of corn being shelled from the cob were directed directly down onto the screen 84. Since the grains of corn were projected with considerable velocity it was found that the screen was comparatively short lived. The provision of the inclined baffle wall 83 against which the shelled corn is first directed by virtue of the horizontal positioning of the rag iron 40 materially lengthens the life of the screen 84.

As best shown in Figures 1 and 5, the upper end of the conveyor 1 is pivotally attached to the sheller so as to be capable of up and down movement with respect thereto. On each side of the conveyor at its upper end, a casting 90 is bolted. This casting has a flange 91 and a flange 92 extending outwardly from the casting. The outer edges of these flanges having a bearing surface of cylindrical contour. The bearing surface of the flange 91 bears on the inner bearing surface of a flange 94 which extends inwardly from the casting 95 which supports the bearings 96 of shaft 21. A removable casting 97 is bolted by means of bolts 98 to the casting 95. This casting has an inwardly extending flange 99 having an inner bearing surface which engages the bearing surface of the flange 92. The conveyor is thus pivotally mounted at its upper end, being rotatable about the axis of curvature of the bearing surfaces and may be quickly detached by the removing of the bolts 98.

The receiving end of the conveyor 1 may be raised and lowered by manually operated mechanism which will now be described. Referring more particularly to Figures 6 and 7, it will be noted that the receiving end of the conveyor 1 is supported by means of a pair of braces or supporting members 100 suitably pivoted at their lower ends to the frame 2 of the sheller, as by bolts 101. At their upper ends the braces 100 support bearings 102 bolted to the braces 100 by means of bolts 103. A shaft 104 is journaled in the bearings 102, and to the shaft 104 is secured a pair of pinions 106 and 107 by keys 108 and 109. A pair of castings 111 are bolted to the under side of the conveyor 1, and these castings have an elongated slot 112 in each through which the shaft 104 projects. Each of the pinions 106 and 107 is provided with a hub 114 which engages the upper end of the slot 112 and, in effect, provides a rolling support for the lower end of the conveyor 1. The teeth of the pinions 106 and 107 engage teeth 116 formed in the lower edge of rack members 117 formed in the inner lower edge of the castings 111. While I have shown the racks 117 as formed integral with the castings 111 it is obvious that they may be formed separate if desired. The castings 111 are bolted to the conveyor 1 by means of bolts 120.

Mounted on one projecting end of the shaft 104 is a hand wheel 122 having a hub 123 provided with ratchet teeth 124, best shown on Figure 6. The right hand bearing member 102 as viewed in Figure 7 is provided with an upstanding ear 125 to which is pivoted a lock member 128, as by means of a pivot bolt 129.

The elevation of the conveyor 1 may be varied by rotating the shaft 104 in one or the other direction. To elevate the lower or receiving end of the conveyor 1 the hand wheel 122 is rotated in a counterclockwise direction as viewed in Figure 6 thereby causing the brace members 100 to raise the conveyor 1. When it is desired to lower the conveyor 1 all it is necessary to do is to release the lock 128 and allow the weight of the conveyor 1 to rotate the shaft 104 under control of the hand wheel 122. At any point of its travel between the upper and lower ends of the slots 112 the lock 128 may be engaged with the teeth 124 to thereby hold the conveyor 1 in that position.

The operation of my improved corn sheller is believed to be apparent from the foregoing description. Ear corn is deposited in the conveyor 1 and the drag chains 17 deliver the ears in longitudinal or end to end alignment between adjacent feed wheels 20. See Figure 3. The opposite rotating feed wheels 20 and beater 23 direct the ears of corn so that they pass above the end of the guard 72 and into engagement with the rapidly rotating beveled runners 30, the stationary rag iron 40 and the oppositely rotating straight runners 32. The shelled corn is projected against the inclined baffle wall 83 from which it falls by gravity onto and through the screen 84. The cobs and husks remain on top of the screen and pass thereover by virtue of the blast of air from the fan or blower 7 and are delivered, respectively, to the cob stacker 12 and the blower 11. The guard members 72 prevent ears of corn from being lodged or jammed down between the feed wheels 20 and the adjacent beveled runner 30. The position of the rag irons 40 to accommodate the particular size or condition of corn being shelled may be adjusted by loosening the nuts 65 and rotating the cranks 60 to raise or lower the rag iron support 42, pivoting the same about its pivotal axis coinciding with the axis of the feeder shaft 24. The tension on each rag iron 40 may be manually adjusted by tightening or loosening the thumb nut 47. By virtue of the fact that the portion 50 of the rag iron support 42 being curved about the beater axis as a center no opportunity is afforded for ears of corn to be wedged between the beater and the rag iron support no matter what position the support may be in.

While I have described in connection with the accompanying drawings one preferred embodiment of my invention, it is to be understood that my invention is not to be limited to the specific structure shown and described but that, in fact, widely different means may be employed in the practice of the broader aspects of my invention.

What I claim, therefore, and desire to secure by Letters Patent is:

1. In a corn sheller, the combination of a frame, journal sleeves supported in the frame, a rotating beater journaled in said sleeves, a rag iron support closely encircling said beater and also journaled on said sleeves, and means frictionally held in position on said frame for adjusting the position of said support.

2. In a corn sheller, the combination of a frame, journal sleeves supported in the frame, a rotating beater journaled in said sleeves, a rag iron support including a shield encircling the beater and curved about an axis coinciding with the axis of said rotating beater, said support being also journaled on said sleeves, and means frictionally held in position on said frame for adjusting the position of said support.

3. In a corn sheller, the combination of a frame, conveyor means for directing corn to be shelled, a beater shaft having beater elements thereon, a feed wheel shaft journaled in said frame and cooperating with said beater elements, and shelling mechanism including a beveled runner, a rag iron movable to and from said runner, and supporting means for said rag iron pivoted coaxially with respect to said beater shaft and including a portion curved about said beater elements and another portion curved about the feed wheels mounted on said feed wheel shaft.

4. A corn sheller comprising, in combination, a frame, shelling mechanism supported by the frame and including a plurality of feed wheels and bevel runners journaled in the frame to rotate about spaced apart axes, sprockets rotatable with said feed wheels, said wheels and runners overlapping in alternate arrangement, a transverse supporting member secured to the frame and extending underneath said bevel runners, and a plurality of upstanding guard fingers on said support and projecting between adjacent feed wheels and partially embracing the periphery of said runners, each of said fingers having an upper guiding face substantially tangent with respect to said sprockets.

5. In a corn sheller having, a frame and a movable rag iron support, means to adjust the support comprising a rotatable member bearing against the frame, a collar embracing said rotatable member and having a rocking abutment seated on said frame, and adjusting means clamping the collar to the frame and said rotatable member.

6. A corn sheller comprising, in combination, a frame, shelling mechanism supported by the frame and including a plurality of feed wheels and toothed bevel runners journaled in the frame to rotate about spaced apart axes, sprockets rotatable with said feed wheels, conveyors trained over the sprockets, said wheels and runners overlapping in alternate arrangement, a transverse supporting member secured to the frame and extending adjacent said bevel runners, and a plurality of upstanding guard fingers on said support projecting between adjacent feed wheels and partially embracing the periphery of said runners, each of said fingers having an upper guiding face disposed in a plane which is substantially tangent with respect to the upper bight of the conveyors and to the base of the teeth of the bevel runners.

7. In a corn sheller, the combination of a housing, disk action sheller mechanism mounted in said housing including bevel runners and straight runners rotating about axes spaced apart in a fore and aft direction in said housing, a reciprocating screen mounted directly below said bevel and straight runners for conveying the cobs, said housing comprising a rear wall disposed in rear of said straight runners and above said screen and inclined in a direction downwardly and rearwardly from said straight runners and towards said screen, and a rag iron cooperating with said runners and positioned to direct shelled corn against said inclined rear wall, said wall deflecting said corn downwardly upon said screen.

In witness whereof, I hereunto subscribe my name this 30 day of June, 1930.

ARTHUR B. DIETERICH.